Figure 1:
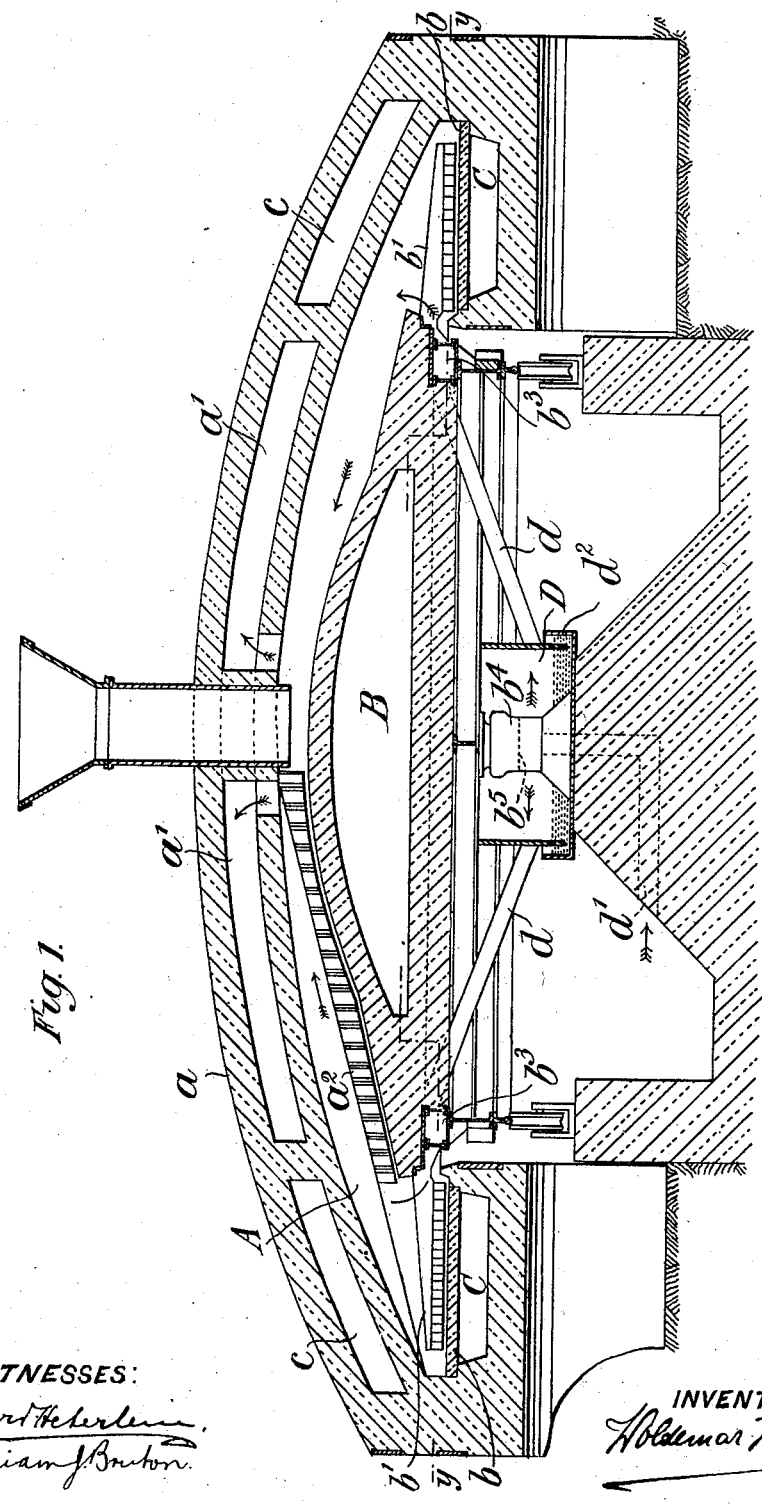

No. 888,502. PATENTED MAY 26, 1908.
W. HOMMEL.
ROTARY FURNACE APPLICABLE FOR USE IN ROASTING ORES OR THE LIKE.
APPLICATION FILED NOV. 23, 1907.
3 SHEETS—SHEET 1.

WITNESSES:

INVENTOR:

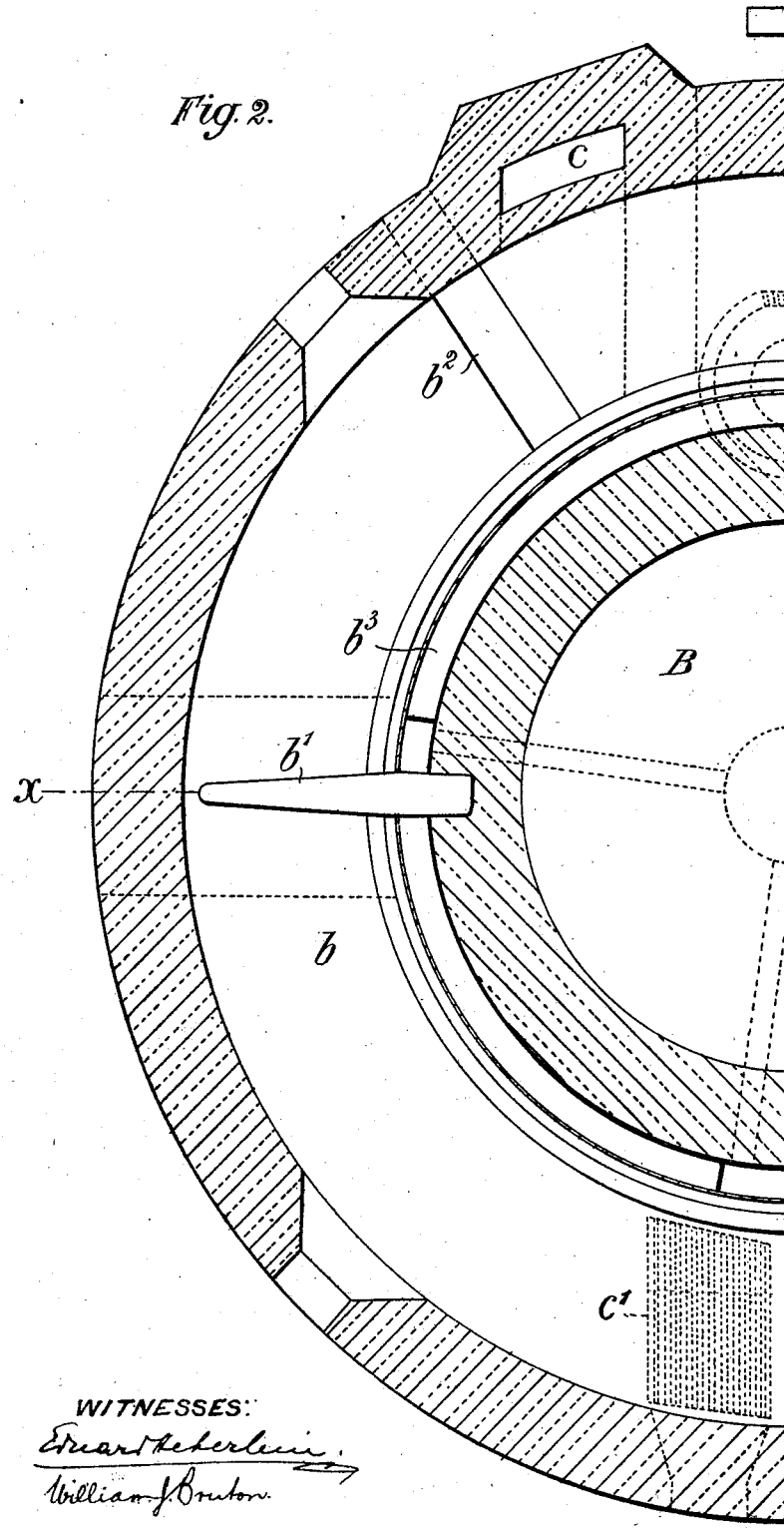

No. 888,502. PATENTED MAY 26, 1908.
W. HOMMEL.
ROTARY FURNACE APPLICABLE FOR USE IN ROASTING ORES OR THE LIKE.
APPLICATION FILED NOV. 23, 1907.
3 SHEETS—SHEET 3.
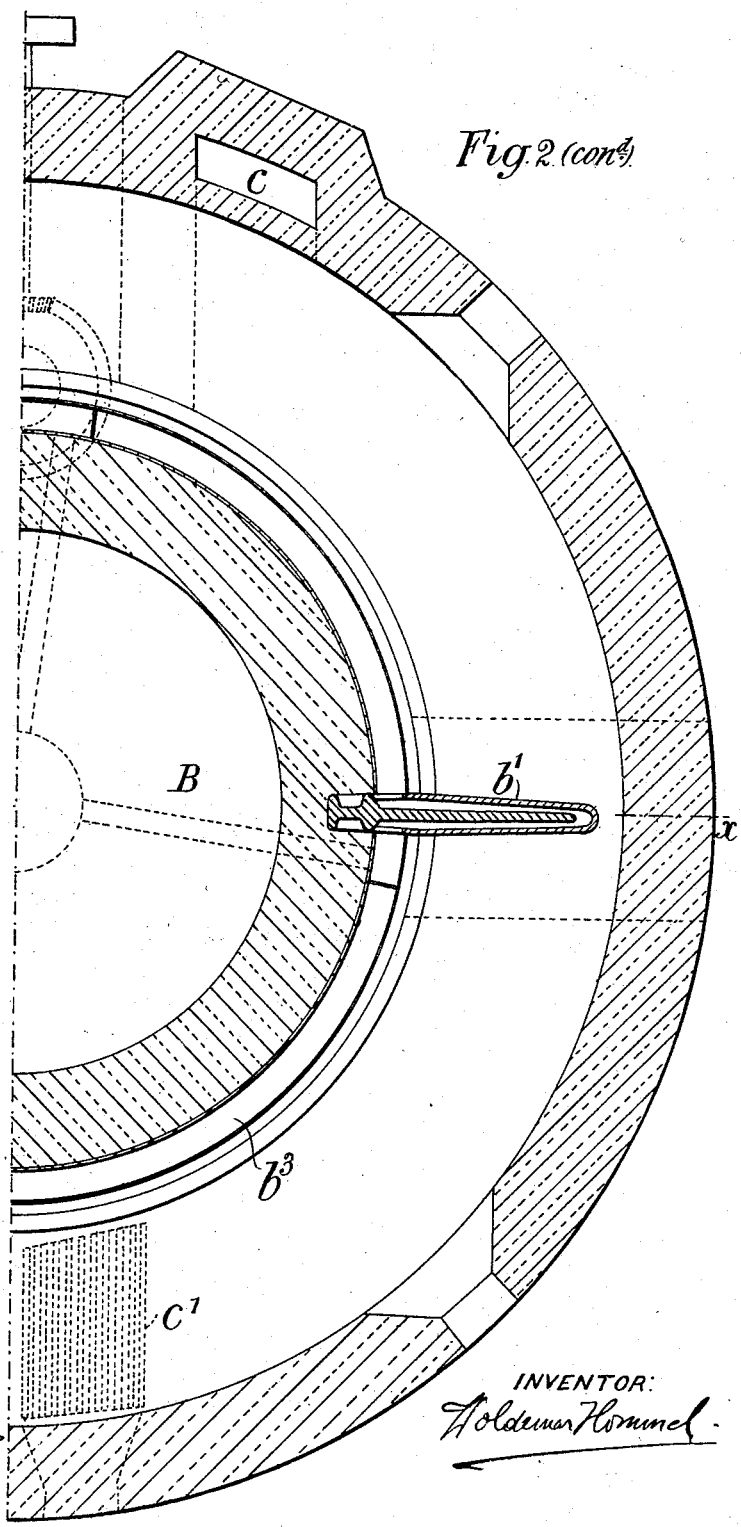
Fig. 2. (cont⁴)
WITNESSES: INVENTOR:

UNITED STATES PATENT OFFICE.

WOLDEMAR HOMMEL, OF LEE, ENGLAND.

ROTARY FURNACE APPLICABLE FOR USE IN ROASTING ORES OR THE LIKE.

No. 888,502.  Specification of Letters Patent.  Patented May 26, 1908.

Application filed November 23, 1907. Serial No. 403,470.

*To all whom it may concern:*

Be it known that I, WOLDEMAR HOMMEL, residing at 17 Micheldever Road, Lee, in the county of Kent, England, a citizen of the Swiss Confederation, have invented a certain new and useful Improved Rotary Furnace Applicable for Use in Roasting Ores and the Like, of which the following is a specification.

This invention relates to an improved construction of rotary furnace adapted for calcining materials of various descriptions, but more particularly intended for use in roasting sulfid ores; one of the principal objects in view being to prevent or restrict the access of air to the ore when undergoing the final portion of the treatment, but little air being required at that stage, while the maintenance of the greatest heat available is of essential importance.

The accompanying drawings illustrate a rotary furnace constructed according to my invention, Figure 1 being a vertical section on the line $x$—$x$ in Fig. 2 and Fig. 2 a horizontal section on the line $y$—$y$ in Fig. 1.

Apparatus constructed according to my present invention comprises a circular chamber A, composed of fire-bricks or other fire-resisting material, formed with an arched roof $a$. The floor or hearth of this chamber consists of two parts, a central portion B which is circular and convex, and which is rotated, surrounded by an annular portion $b$ which is flat and which is fixed. Beneath each half of the annular portion of the hearth is formed a flue C, which communicates with a corresponding return flue $c$ arranged in the roof of the ore-chamber A. The heating gases, which are derived from two suitably disposed fire-places or furnaces $c'$ $c'$, circulate through these flues and effect the roasting of the ore while being gradually advanced in a circular direction, as hereinafter described, along the annular portion $b$. The ore, while resting upon the central or rotating portion of the floor, is not subjected, to any noticeable extent, to the heat of the furnace gases; but is nevertheless subject to the heat resulting from the combustion of the self-contained sulfur. The waste gases evolved pass into chambers $a'$ formed in the roof of the ore-chamber, and in their passage therethrough yield a certain portion of their heat to the said chamber.

When treating materials containing a deficient percentage of sulfur the fire-gases may be led over the entire roof of the ore-chamber.

Between the roof of the ore-chamber and the rotating portion of the floor is arranged a rabble or device $a^2$ provided with obliquely set scrapers adapted for stirring the material and for feeding it gradually outwards. On the material reaching the periphery of the rotating portion of the hearth, it falls upon the fixed or annular portion thereof. Attached to the periphery of the rotating portion, and immediately above the fixed portion thereof, is arranged one or more rabbles or stirring appliances $b'$, adapted to stir and gradually to push the material round the annular portion of the hearth towards the discharge outlet $b^2$. Thus during the earlier portion of the travel of the material through the ore-chamber, it partakes of a generally radial movement; while, during the latter portion of its journey, it partakes of a generally circumferential movement.

Co-axial with the rotating portion of the floor is arranged an air-chamber D which communicates, by way of pipes or passages $d$, with an annular chamber $b^3$ formed at or about the periphery of the rotating portion of the hearth. This chamber, which may assume the form of a hollow ring, not only serves to support the rotating portion of the floor, but forms a conduit for air; the temperature of the edge of the rotating portion of the floor being at the same time moderated. The heated air escapes from the conduit by way of apertures, formed by preference in the lower side thereof, and passes thence into the ore-chamber, through which the heated air travels in the direction shown by the arrows in Fig. 1, the ingress of cold air being thereby intercepted. The supply of air to the furnace is constant; but before the final stage of the treatment, the ore has reached the fixed annular hearth, and having arrived there, has passed beyond the path traversed by the air current, but little of the air reaching the ore while on the fixed portion of the hearth.

Air is admitted to the chamber D by way of a passage $d'$ formed in the support for the pivot $b^4$ of the rotating portion B; the passage $d'$ communicating with outlet passages $b^5$ formed in said pivot whence the air passes to the pipes $d$. To prevent the escape of air from the chamber D a bed $d^2$ of sand is placed on the floor of the chamber.

What I claim as my invention and desire to secure by Letters Patent, is:—

1. The herein described rotary furnace, applicable for use in roasting ores and the like, comprising an ore chamber the floor or hearth of which consists of a rotary central portion, and a surrounding annular portion which is stationary; a series of obliquely set scrapers, arranged above the central portion of the hearth and adapted to work the ore gradually towards the periphery of the latter, and one or more scrapers, arranged above the annular portion of the hearth, attached to the central rotating portion and adapted to sweep the ore in a circumferential direction towards the outlet orifice in the floor of the stationary portion, the furnace gases being caused to circulate both above and below that portion, substantially as herein described.

2. In a rotary furnace of the kind wherein the floor or hearth of the ore-chamber comprises a central rotary portion and a surrounding annular portion which is stationary, providing the rotary portion with an annular chamber arranged towards the periphery thereof and adapted to supply heated air to the ore-chamber, substantially as herein described.

In testimony whereof I have signed my name to this specification in the presence of two subscribing witnesses.

WOLDEMAR HOMMEL.

Witnesses:
 WILLIAM J. BRUTON,
 W. CORY